July 5, 1949.  H. J. HALL ET AL  2,475,238
REFERENCE JUNCTION FOR THERMOCOUPLE LEADS
Filed Dec. 20, 1945  2 Sheets-Sheet 2
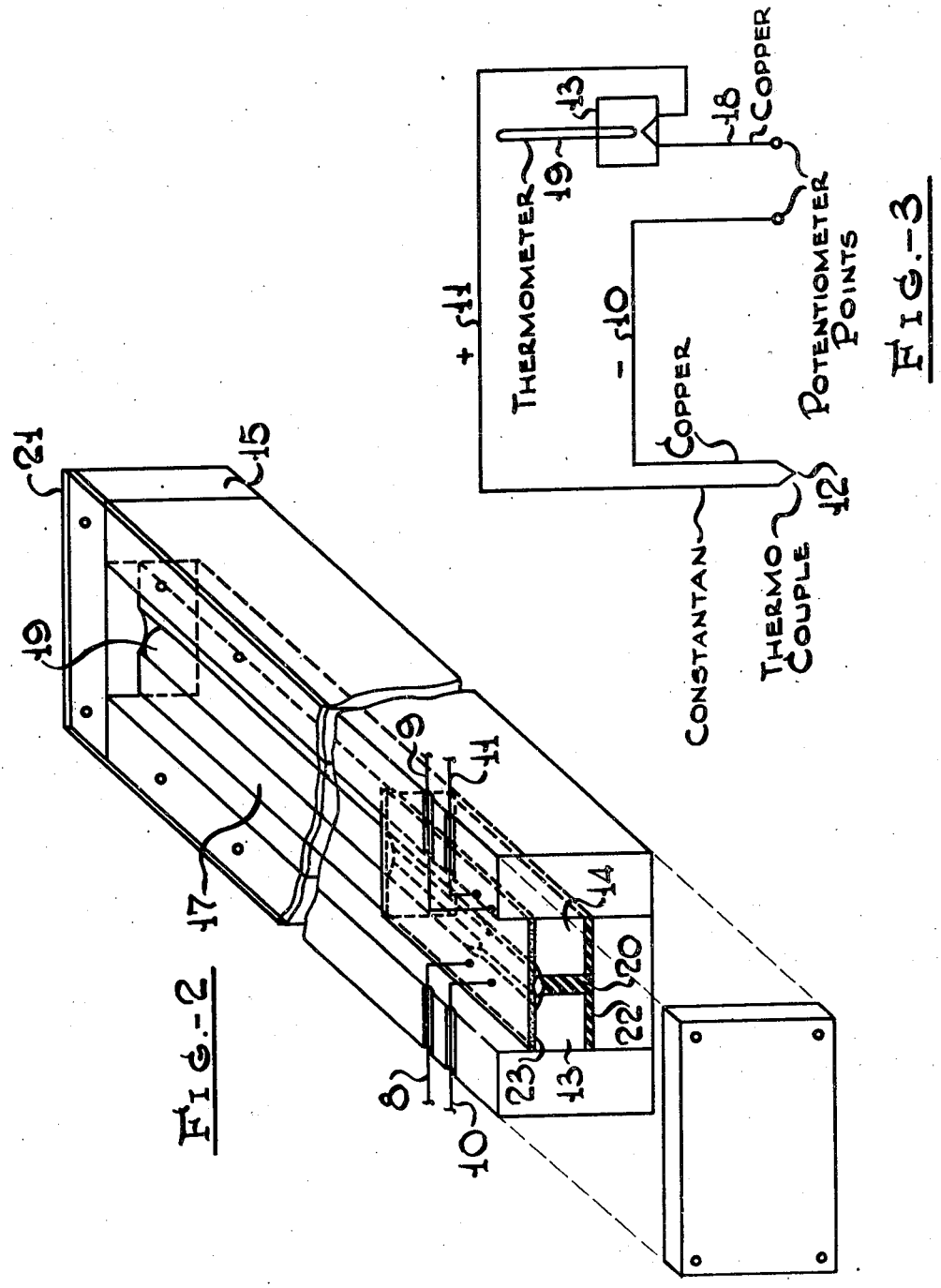
Homer J. Hall
Fredrick L. Jonach  Inventors
By J. H. Small  Attorney Patented July 5, 1949

2,475,238

UNITED STATES PATENT OFFICE 2,475,238

REFERENCE JUNCTION FOR THERMOCOUPLE LEADS

Homer J. Hall, Cranford, N. J., and Fredrick Lowell Jonach, New York, N. Y., assignors to Standard Oil Development Company, a corporation of Delaware Application December 20, 1945, Serial No. 636,247

2 Claims. (Cl. 73—361)

This invention relates to thermocouples and more particularly relates to a reference junction for thermocouple leads.

It is common practice in industrial control to measure temperatures by means of thermocouples. Such a thermocouple consists of two dissimilar metals such as iron and an alloy known as constantan consisting of 60% copper and 40% nickel in contact in a circuit. One junction, known as the hot junction is heated while the other junction is maintained at a lower temperature and is known as the cold junction. The difference in temperature causes a small current to flow through the circuit which is measured and used to determine the temperature of one of the junctions, that of the other being known.

The current flowing through such a thermocouple is generally measured by means of a potentiometer, consisting of a slide wire resistance connected with a battery and a sensitive galvanometer through a movable contact, so that the battery potential is balanced against the current generated by the thermocouple. Thus by moving the contact along the resistance the galvanometer can be made to register zero indicating an exact balance. From this, the true potential of the couple can be obtained from Ohm's law, $E=IR$ where $I$ is the current flowing through the resistance. If the battery, which is generally an ordinary 1½ volt #6 dry cell, were capable of always giving the same amount of current, the slide wire could be calibrated to read millivolts or temperature directly. Since this is not possible, a standard cell which will give a fixed E. M. F. is substituted for the thermocouple to make a preliminary reading in a separate test circuit which may be connected to the same slide wire. By this means, the battery voltage is checked against the fixed voltage. The standard cell could not replace the battery since it will only give fixed voltage for short periods of time with substantially no current flowing. The galvanometer is used as a zero instrument and therefore no calibrated galvanometric scale is necessary.

Since a thermocouple operates because a current is generated when one junction is at a higher temperature than the other, the value of the current generated is relative to the temperature of the other junction of this couple. This means it is necessary to know the temperature of the cold junction very accurately so that a fixed reference point can be obtained to change the reading from a relative value to a finite value. Some potentiometers are equipped with automatic compensators which operate on various electrical principles. These are limited to work where extremely accurate readings are not necessary. Where a precision instrument is used, it is equipped with a hand compensator. This consists of a small slide wire connected to the main slide wire. When the temperature of the reference junction is converted to E. M. F. and set on this dial, the actual thermometric E. M. F. of the couple is obtained. The difficulty is in knowing the reference junction temperature. It is possible to immerse the cold junction to the thermocouple in an ice bath and use copper leads to the potentiometer. However, for continuous routine operation this is undesirable because it is very difficult to maintain an ice bath at exactly 32° F. for long periods of time, without undue time and effort. It may also be impractical to keep a supply of pure ice on hand and furthermore, the use of the ice bath restricts the instrument to use in a laboratory. Another method is to set a thermometer at the point of the potentiometer where the thermocouple leads are tied into the instrument. This method has been found to give poor results at rapid changes in room temperature, drafts or exposure to sunlight, will give a thermometer reading which is not consistent with the junction temperature.

It is, therefore, the main object of this invention to provide means for more accurately determining the temperature of a thermocouple reference junction.

It is a further object of this invention to provide a thermocouple reference junction which is accurate, easily read and sensitive within a few tenths of a degree and yet is not subject to fluctuations due to momentary changes in the temperature of the surroundings.

It is a further object of this invention to provide an instrument which can be used in the field as well as the laboratory.

These and other objects of the invention are attained by enclosing a precision thermometer in an insulated box with the bulb in intimate contact with shaped metal blocks serving as the reference junction of a thermocouple.

Certain preferred details of construction together with additional objects and advantages will be apparent and the invention itself will be best understood by reference to the following specification and to the accompanying drawings wherein:

Figure 2 is a detailed plan view of one form of reference junction according to this invention.

Figure 3 illustrates another form of reference junction according to the invention.

Figure 1:
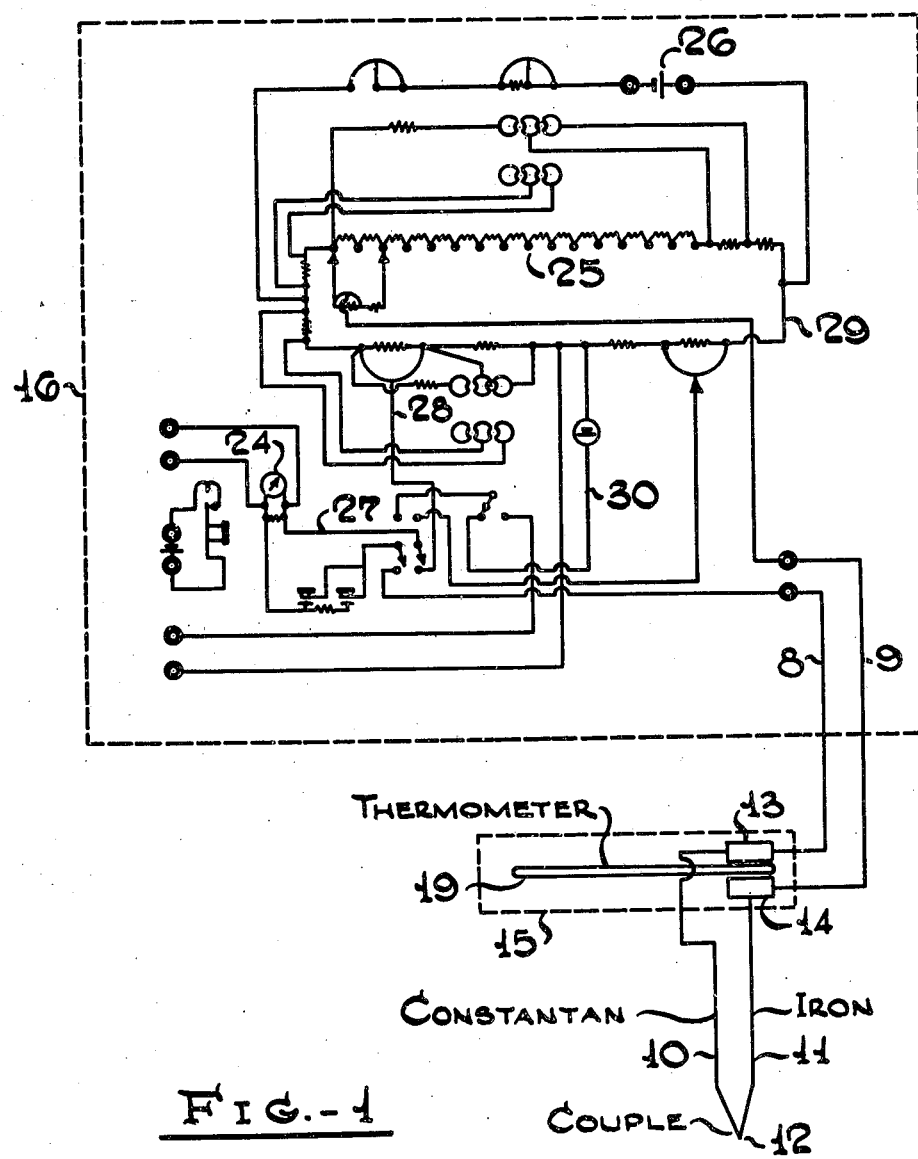
Figure 1 is a diagrammatic illustration of the invention showing one embodiment of the novel reference junction and thermocouple together with a suitable potentiometric circuit.

Referring now to Figure 1 there is shown a constantan wire 10 and iron wire 11 forming a junction 12. The opposite ends of each of the wires 10 and 11 end in copper blocks 13 and 14 respectively in junction box 15 which are in turn coupled into potentiometer 16 by means of copper wires 8 and 9.

As shown more clearly in Figure 2 junction box 15 is provided with a thermometer 19 the lower portion of which is cradled between copper blocks 13 and 14 separated by insulating material 20 such as rubber. The upper portion of the thermometer rests on a wooden block 17. The box itself is provided with a transparent cover 21, while the copper blocks rest on rubber strips 22 within the box and are covered with a layer of felt 23.

The potentiometer 16 may be any type of potentiometer bridge circuit but is shown as the circuit described and illustrated in Leeds and Northrup Direction Book Std. 21,233 for Portable precision potentiometer No. 8662. It consists essentially of galvanometer 24, wire resistance 25 and battery 26. The iron wire 11 of the thermocouple is connected to copper block 14, from which copper wire 9 leads to one end of the resistance 25. The constantan wire 10 is connected to block 13, from which copper wire 8 leads directly to the galvanometer 24, which in turn is connected to the other end of the resistance 25 by leads 27, 28 and 29. The potentiometer is also provided with the usual standard cell 30 for checking the voltage of battery 26.

In Figure 3 is shown an alternative embodiment of the reference junction according to the present invention. In this embodiment the junction box is placed only in one lead from the thermocouple 12 and utilizes only one metal block 13. The thermometer 19 may be cradled in block 13 as in Figure 2. However, there is provided only one lead from the block to the potentiometer. The other lead 10 from thermocouple 12 is connected directly to the potentiometer. This embodiment may be used in the particular case where thermocouple lead 10 is made of the same metal as used in the wiring of the instrument, e. g. copper or other metal of high conductivity. In this case the lead 10, junction block 13 and lead wire 18 to the potentiometer may all be made of the same metal. The closer the lead wires approach the composition of the wiring of the instrument the less chance there is for an auxiliary current to be produced due to any difference in temperature between the lead wires and the metal of the thermocouple.

By the use of the insulated reference junction box 15 described above, temperature changes of the terminal posts in the potentiometer no longer affect the observed E. M. F. from the thermocouple. Copper blocks 13 and 14 in insulated box 15 serve as an accurate room temperature junction and their temperature is accurately measured by the thermometer 19. Thus the copper blocks are insulated from sudden changes in room temperature and there is little change or lag between the observed thermometer reading and the actual temperature of the blocks. This is in sharp contrast to the usual procedure of putting an open thermometer on top of the potentiometer box near the terminal posts. Furthermore, since the metal blocks are relatively large the heat capacity is high and temperature changes would have to be high before the blocks would change in temperature to any considerable degree.

The junction box may be placed within the potentiometer box itself or may be separately housed as shown.

While we have herein illustrated and described one embodiment of our apparatus with considerable particularity, we do not desire to limit ourselves thereto or to the carrying out of our method by the use of apparatus of that character alone, as it will be evident that various changes may be made in the details thereof, if desired, without departing from its principal features and characteristics and from the spirit and scope of our invention as defined in the appended claims.

The nature and objects of the present invention having been thus described and illustrated, what is claimed as new and useful and is desired to be secured by Letters Patent is:

1. A thermocouple circuit having hot and cold junctions comprising two different metals in direct contact at one end forming one junction, a copper block attached to the other end of each of said metals, forming said other junction, an insulated housing for said copper blocks, a thermometer sandwiched between said blocks and means for electrically insulating said blocks from each other.

2. A thermocouple circuit having hot and cold junctions comprising copper and one other metal in direct contact at one end forming one junction, a copper block attached to the other end of each of said metals, forming said other junction, an insulated housing for said copper blocks, a thermometer sandwiched between said blocks and means for electrically insulating said blocks from each other.

HOMER J. HALL.
FREDRICK L. JONACH.

REFERENCES CITED

The following references are of record in the file of this patent:

UNITED STATES PATENTS

| Number | Name | Date |
| --- | --- | --- |
| 764,175 | Bristol | July 5, 1904 |
| 880,272 | Bristol | Feb. 25, 1908 |
| 1,122,345 | Wilbur | Dec. 29, 1914 |
| 1,367,026 | Drinker | Feb. 1, 1921 |
| 2,058,078 | Harrison | Oct. 20, 1936 |